United States Patent
Cuddihy et al.

(10) Patent No.: US 10,434,975 B2
(45) Date of Patent: Oct. 8, 2019

(54) ROBUST SEAT BELT USAGE SENSOR

(71) Applicant: Ford Global Technologies, LLC, Dearborn, MI (US)

(72) Inventors: Mark A. Cuddihy, New Boston, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 15/468,227

(22) Filed: Mar. 24, 2017

(65) Prior Publication Data

US 2018/0272987 A1    Sep. 27, 2018

(51) Int. Cl.
| | | |
|---|---|---|
| *B60R 22/12* | (2006.01) | |
| *B60R 22/18* | (2006.01) | |
| *B60R 22/34* | (2006.01) | |
| *B60R 22/48* | (2006.01) | |

(52) U.S. Cl.
CPC .............. *B60R 22/12* (2013.01); *B60R 22/18* (2013.01); *B60R 22/34* (2013.01); *B60R 22/48* (2013.01); *B60R 2022/4808* (2013.01); *B60R 2022/4891* (2013.01)

(58) Field of Classification Search
CPC ................................ B60R 22/48; B60R 22/12
See application file for complete search history.

(56) References Cited

U.S. PATENT DOCUMENTS

| | | | |
|---|---|---|---|
| 3,806,867 A | 4/1974 | Quantz | |
| 4,885,566 A | 12/1989 | Aoki et al. | |
| 6,203,059 B1 | 3/2001 | Mazur et al. | |
| 7,988,196 B2 * | 8/2011 | Wang | B60R 22/023 |
| | | | 280/801.1 |
| 9,145,126 B2 * | 9/2015 | Kinoshita | B60K 28/12 |
| 2007/0182534 A1 | 8/2007 | Gregory | |
| 2009/0295557 A1 | 12/2009 | Fischer et al. | |
| 2014/0067189 A1 * | 3/2014 | Smith | G08G 1/166 |
| | | | 701/29.1 |
| 2015/0360643 A1 | 12/2015 | Cech et al. | |
| 2017/0088096 A1 * | 3/2017 | Luebbers | B60R 21/01544 |

FOREIGN PATENT DOCUMENTS

| | | |
|---|---|---|
| EP | 1108624 A2 | 6/2001 |
| IN | 201641022646 | 8/2016 |
| JP | S63305057 A | 12/1988 |
| JP | 2011068206 A | 4/2011 |

OTHER PUBLICATIONS

Search Report from United Kingdom Intellectual Property Office dated Sep. 3, 2018 regarding Application No. GB1804459.4 (5 pages).

* cited by examiner

*Primary Examiner* — Nicole T Verley

(74) *Attorney, Agent, or Firm* — Frank MacKenzie; Bejin Bieneman PLC

(57) ABSTRACT

A seatbelt assembly includes a seatbelt, a conductive sensing conductor and a conductive shield. The seatbelt has a lap band. The conductive sensing conductor is fixed to a first side of the lap band. The conductive shield is fixed to a second side of the lap band and is substantially aligned with and substantially overlaps the sensing conductor. An insulating layer is disposed between the sensing conductor and the conductive shield.

20 Claims, 4 Drawing Sheets

ROBUST SEAT BELT USAGE SENSOR

BACKGROUND

Seatbelt interlocks have been used in the past in vehicles and can help ensure that occupants are properly belted before the vehicle can be started. Systems relying on just a switch inside a seatbelt buckle may be tricked by a seat occupant sitting on a buckled belt rather than placing the belt over their lap, and then buckling the belt. There is a need for a system that detects when a seatbelt is properly used by a seat occupant.

DETAILED DESCRIPTION

Figure 1:
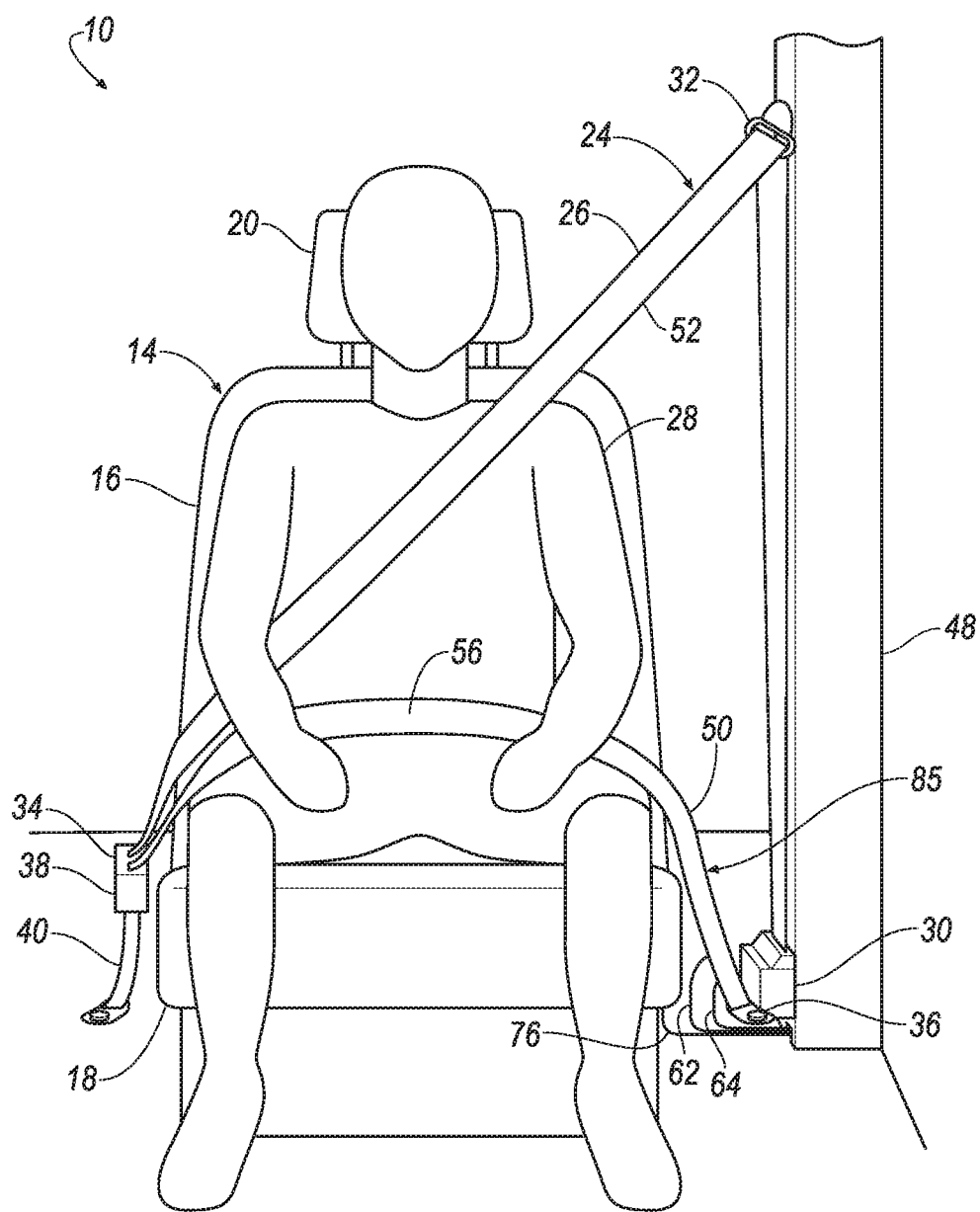
FIG. 1 is a rear-facing view of an occupied example left-hand seat with a seatbelt system in a properly buckled condition.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A seatbelt assembly includes a seatbelt, a conductive sensing conductor and a conductive shield. The seatbelt has a lap band. The conductive sensing conductor is fixed to a first side of the lap band. The conductive shield is fixed to a second side of the lap band and is substantially aligned with and substantially overlaps the sensing conductor. An insulating layer is disposed between the sensing conductor and the conductive shield.

The seatbelt assembly may have the lap band as the insulating layer.

The seatbelt assembly may have each of the sensing conductor, the conductive shield and the insulating layer all on a common side of the lap band.

The seatbelt assembly having the sensing conductor, the conductive shield and the insulating layer on a common side of the lap band may also have a non-conductive coating disposed over and enclosing the sensing conductor, insulating layer, and the conductive shield.

The seatbelt assembly may also include a retractor receiving the seatbelt on a spool. The seatbelt may have a shoulder band between the retractor and the lap band. A latch plate may be slidably disposed on the seatbelt, separating the lap band from the shoulder band. The lap band remains outside of the retractor when the seatbelt is in a retracted condition.

The seatbelt assembly may include a latch plate and an anchor. The latch plate may be slidably disposed on the seatbelt, separating the lap band from a shoulder band. The anchor is fixed to an end of the lap band and the seatbelt. The sensing conductor may have a length of substantially twenty centimeters or more, extending from a first end of the sensing conductor below a lowermost position of the latch plate and terminating before reaching the anchor.

A restraint system may include a seatbelt assembly and a sensing circuit. The seatbelt assembly includes a seatbelt, a sensing conductor and a shield. The seatbelt has a lap band. The sensing conductor is conductive and is fixed to a first side of the lap band. The shield is also conductive and is fixed to a second side of the lap band. The shield is substantially aligned with and substantially overlaps the sensing conductor. An insulating layer is disposed between the sensing conductor and the conductive shield. The sensing circuit is electrically connected to the sensing conductor and the shield.

The restraint system may have the lap band as the insulating layer.

The restraint system may have each of the sensing conductor, the conductive shield and the insulating layer all on a common side of the lap band.

The restraint system having the sensing conductor, the conductive shield and the insulating layer on a common side of the lap band may also have a non-conductive coating disposed over and enclosing the sensing conductor, insulating layer, and the conductive shield.

The restraint system may also include a grounding element for disposition within a seat bottom and electrically connected to the sensing circuit.

The restraint system may further include a retractor receiving the seatbelt on a spool. The seatbelt may have a shoulder band between the retractor and the lap band. A latch plate is slidably disposed on the seatbelt, separating the lap band from the shoulder band. The lap band remains outside of the retractor when the seatbelt is in a retracted condition.

The restraint system may include a latch plate and an anchor. The latch plate may be slidably disposed on the seatbelt, separating the lap band from a shoulder band. The anchor may be fixed to an end of the lap band and the seatbelt. The sensing conductor may have a length of substantially twenty centimeters or more and extending from a first end of the sensing conductor below a lowermost position of the latch plate. The sensing conductor may terminate before the anchor.

The restrain system may include a computing device programmed to allow vehicle movement only when the computing device determines that the seatbelt is properly buckled based on a signal from the circuit.

An example restraint system 10 for a vehicle 12 as shown in FIGS. 1-4 includes a seatbelt and may include an airbag (not shown) for vehicle occupant locations, including, but not limited to, a first seat, e.g., a seat 14, and other passenger seats (not shown). While the illustrated seat 14 is exemplary of a seat placed on a left side of a vehicle, an alternative seat, e.g., a mirror-image seat, may be placed on the right side of a vehicle or in a center of a vehicle.

The seat 14 as shown in FIG. 1 is a bucket seat. Alternatively, the seat 14 may be a bench seat or another type of seat. The seat 14 may include a seat back 16, a seat bottom 18, and a head restraint 20.

The head restraint 20 may be supported by the seat back 16 and may be stationary or movable relative to the seat back 16. The seat back 16 may be supported by the seat bottom 18 and may be stationary or movable relative to the seat bottom 18. The seat back 16, the seat bottom 18, and/or the head restraint 20 may be adjustable in multiple degrees of freedom. The seat back 16, the seat bottom 18, and/or the head restraint 20 may themselves be adjustable, in other words, adjustable components within the seat back 16, the seat bottom 18, and/or the head restraint 20, and/or may be adjustable relative to each other.

The seat bottom 18 and/or the seat back 16 may include a seat frame (not shown) and a cushion covering 22 supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The cushion covering 22 may include upholstery and padding. The upholstery may be formed of cloth, leather, faux leather, or any other suitable material. The upholstery may be stitched in panels around the frame. The padding may be between the covering and the frame, and may be formed of foam or any other suitable supportive material.

The restraint system 10 includes an example seatbelt system 24 and may also include an airbag system. The illustrated seatbelt system 24 is a three-point system. By three-point, it is meant that the seatbelt, i.e., the webbing, 26 of the system 24 restrains an occupant 28 at three points: at a shoulder, in the example of FIG. 1 the left shoulder, and on both sides of the occupant's lap.

The system 24 may include, in addition to the seatbelt 26, a retractor 30, a D-ring 32, a seatbelt latch plate 34, an anchor 36, a buckle 38, a buckle mount 40, a seat occupant sensor 42, a seatbelt buckle sensor 44, and a seatbelt usage sensor 46.

The retractor receives and dispenses a first end of the seatbelt 26. The retractor 30 may include a spool that extends and retracts the webbing 26. The retractor 30 may be fixed, as illustrated, to the vehicle structure, or alternatively, to the seat frame. If fixed to the vehicle structure, available locations include the vehicle floor and a structural pillar such as a B-pillar 48.

The D-ring 32 receives the seatbelt 26 and directs the seatbelt 26 from the retractor 30 across the shoulder of the occupant 28. The D-ring may be fixed to a structural component of the vehicle, e.g. the B-pillar 48. When the retractor 30 is mounted to one of the B-pillar 48 and the seat frame, the D-ring 32 may be eliminated from the system 24.

The seatbelt latch plate 34, i.e., a clip, selectively engages the buckle 38 on a right side of the occupant. The latch plate 34 is received by a slot 45 in the buckle. The buckle 38 is fixed to the vehicle structure or to the seat frame by the buckle mount 40.

The seatbelt anchor 36 may be in the form of an anchor plate 36. Plate 36 is fixed to a second end of the seatbelt 26 opposite the retractor 30 and is also fixed to one of the frame of the seat 14 and the structure of the vehicle 12 to thereby fix the second end of the seatbelt 26.

The latch plate 34 slides freely along the webbing and, when engaged with the buckle 38, divides the seatbelt 26 into a lap band 50 and a shoulder band 52. The lap band 50 is disposed between the latch plate 34 and the anchor 36. The shoulder band 52 may be disposed between the latch plate 34 and the D-ring 32.

The restraint system 10 may include an occupant sensor 42 programmed to detect occupancy of the vehicle seat 14. Such occupant sensors 42 are known and may be in the form of, for example, weight sensors incorporated into the seat bottom, or infra-red detectors, or motion detectors. The type of occupant sensor 42 selected is not critical.

As an alternative to employing a discrete occupant sensor 42, occupancy of a seat may be indirectly determined. An example of such indirect occupancy determination for a driver's seat is to require simultaneous actuation of multiple vehicle controls, such as both pressing a brake pedal (not shown) in combination with pressing a start switch on a driver's side of the instrument panel.

Buckle sensors 44 may include a switch disposed in each of buckles 38. Switches of sensors 44 may open and close responsive to an insertion of the latch plate 34. The sensors 44 provide data indicative of whether seatbelt 26 is in a buckled condition or an unbuckled condition.

Figure 2:
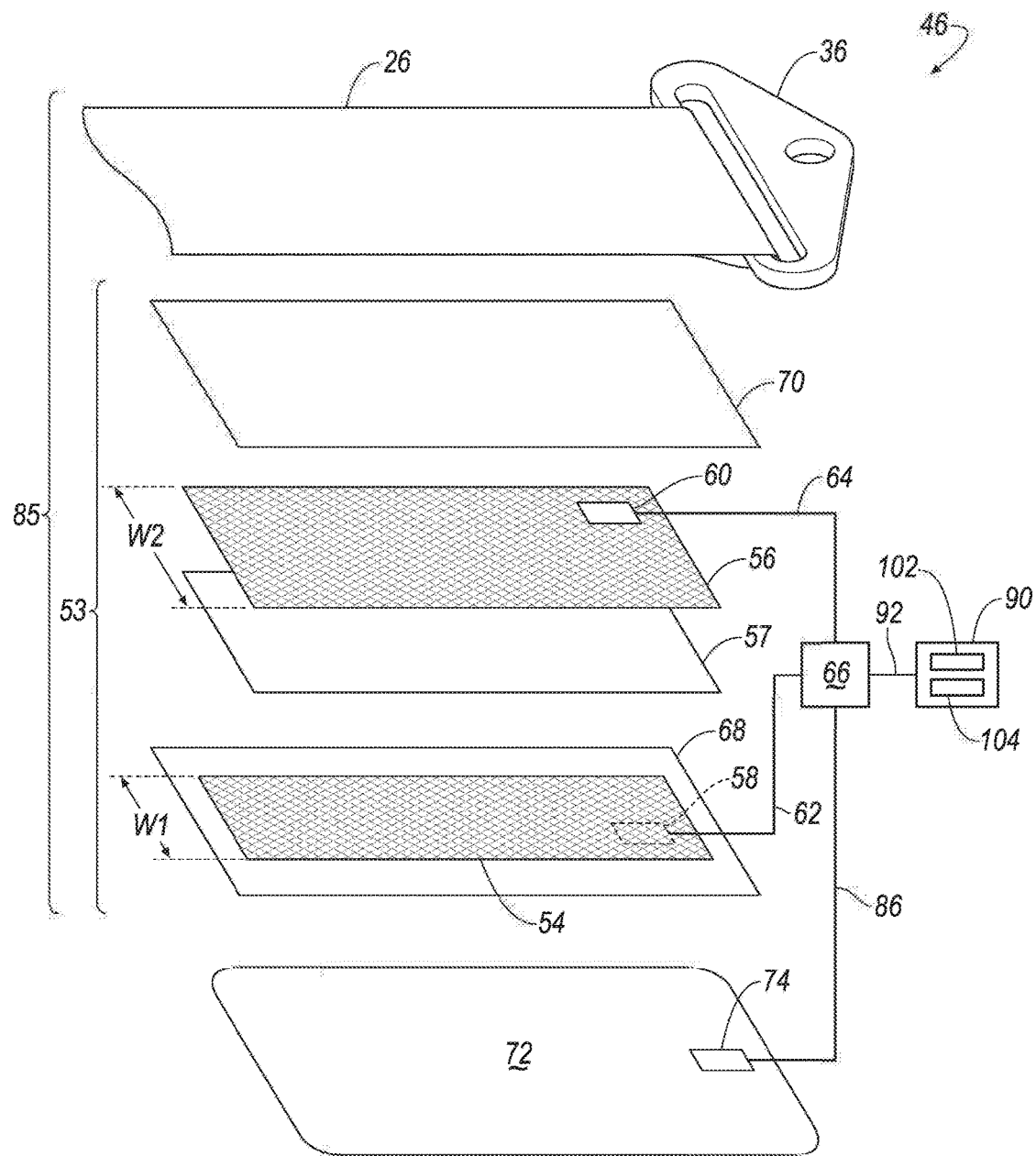
FIG. 2 is a schematic exploded diagram of the seatbelt of FIG. 1.

The seatbelt usage sensor 46 includes components incorporated into the seatbelt 26 and the seat 14 as best illustrated in FIG. 2. A body sensing packet 53 of the sensor 46 is disposed on an occupant-facing side of the seatbelt 26. The packet 53 may include a sensing conductor 54 on an occupant-facing side of the packet 53. The sensing conductor 54 may be formed by coating a fabric with conductive material, with spraying being an example method of applying the conductive material. The entire sensing conductor 54 is conductive, yet remains flexible. An example width of the sensing conductor is W1, less than a width of the seatbelt 26. The sensing conductor 54 may have a length of substantially twenty centimeters or more, extending from a first end of the conductor 54 located, when the seatbelt is in an unbuckled and retracted condition, below a lowermost position of the latch plate 34 and terminating before reaching the anchor plate 36. While sensing conductor 54 is shown as having a rectangular shape, it does not have to be so configured. Alternative shapes may include, by way of example, an oval, a ring, elongated connecting fingers.

The body sensing packet 53 further includes a conductive shield, i.e., an active or driven shield 56, between the sensing conductor 54 and the seatbelt 26. The sensing conductor 54 and the shield 56 are separated by a non-conductive electrical insulating layer 57 therebetween. The shield 56 has a width W2 wider than the width W1 of conductor 54. The shield 56 may also be slightly longer than the conductor 54. The shield 56 and the conductor 54 are positioned over one another such that the shield 56 completely overlaps the conductor 54. As with the sensing conductor 54, the shape of the shield 56 need not be rectangular, so long as the shield 56 completely overlaps the conductor 54. The insulating layer 57 is larger than the conductor 54 and completely overlaps the conductor 54.

Each of the conductor 54 and the shield 56 may have connected thereto an electrical connector, 58 and 60 respectively. The electrical connectors 58, 60 may be in the form of an alligator clip with teeth penetrating the fabric of the conductor 54 and the shield 56 to achieve an electrical connection with the conductive material of each of conductor 54 and shield 56. A first connecting wire 62, for the conductor 54, electrically connects connector 58 and conductor 54 with a sensor circuit 66. A second connecting wire 62, for the shield 56, electrically connects connector 60 and shield 56 with the sensor circuit 66.

The three layers 54, 56 and 57 are enveloped and sealed by a flexible waterproof non-conductive coating, a last part of the sensing packet 53. The coating may be provided by a pair of opposed plastic strips 68, 70 wider and longer than conductor 54 and shield 56. The strips 68, 70 are sealingly bonded to each other in a known manner, e.g., heat bonding, adhesive bonding, to protect against water intrusion.

The packet 53 may be sewn to the occupant-facing side of the lap band 50. Care must be taken to ensure that the sewing operation stitches over or outside the bonding seam to avoid perforating the sealed region of the packet 53. Additional protection of the plastic strip 68 of the packet 53 may be provided by stitching a layer of fabric over the packet 53.

As an alternative to attaching the packet 53 to the lap band 50, a conductive coating may be applied directly to opposing sides of the lap band 50. The coating on the occupant-facing side serves the same purpose as the sensing conductor 54, and the coating on the opposite side is the active shield. Electrical connectors and conductors may likewise be provided. The coated part of the lap band 50 may receive a waterproof coating to protect against water intrusion into the lap band.

Limiting the conductive material to the lap band 50 avoids including the conductive material enter the retractor spool and subjecting the conductive material to the mechanical stresses associated with being coiled and uncoiled from the spool.

As illustrated in FIG. 2, the sensor 46 may also include a conductive seat cushion grounding element 72 disposed in the vehicle seat bottom 18 that may be connected to electrical ground through the circuit 66. The grounding element 72 may be formed of an electrically conductive fabric. The grounding element 72 may be formed by spraying an underside of the covering 22 with conductive material. Alternatively, the grounding element 72 may be provided by a thin sheet of polymer implanted with conductive material. Yet alternatively, the grounding element 72A, 72B may be formed of conductive fabric.

The seat cushion grounding element 72 is engaged by an electrical connector 74. An example connector 74, like connectors 58, 60, may be in the form of an alligator clip. The type of connector is not critical. Alternative connectors, e.g, a metal eyelet, in combination with a ring terminal, may be used as connectors 58, 60 and 74. A ground shield connecting wire 76 electrically connects connector 74 with the sensor circuit 66.

Figure 3A:
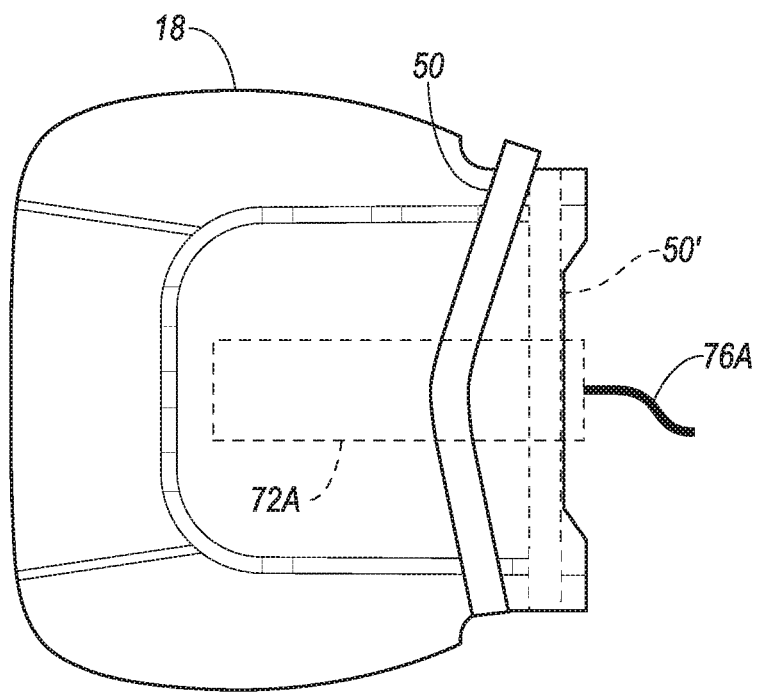
FIG. 3A is a top view of a seat bottom with a grounding element.
Figure 3B:
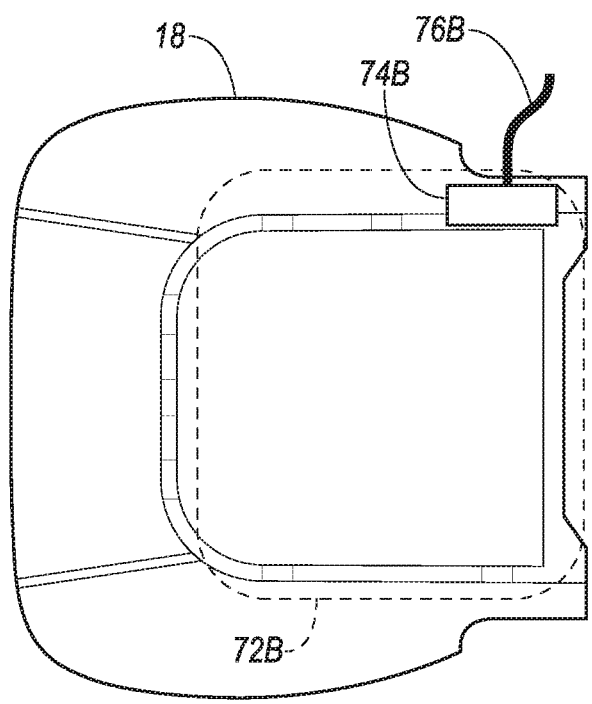
FIG. 3B is a top view of the seat bottom of FIG. 3A with an alternative embodiment of the grounding element.

FIGS. 3A and 3B illustrate alternative configurations 72A, 72B of the grounding element. The grounding element 72A, 72B does not need to completely overlap the sensing conductor 54 and the active shield 56 to allow a determination of an improperly positioned lap band 50. As illustrated in FIG. 3A, a relatively narrow grounding element 72A, less than one quarter of a width of the seat bottom 18, is sufficient. It is desirable to provide the grounding element 72A, 72B with enough length in the fore-aft direction, e.g., one half a length of the seat bottom 18, to allow detection of an improperly positioned belt throughout its anticipated range of location. A first possible location of lap band 50 is shown in solid lines. A second possible location of the lap band is shown by the phantom line representation 50'. The grounding element 72B of FIG. 3B may be as wide as the seat bottom 18 and still provide the desired function, so long as it extends far enough forward to address the anticipated range of placement of the lap band 50.

The grounding element 72, like the sensing conductor 54, is not required to be rectangular in shape. Alternative shapes may likewise include, by way of example, an oval, a ring, elongated connecting fingers.

The grounding element 72A of FIG. 3A is electrically connected to a grounding wire 76A corresponding to the connecting wire 76. Similarly, the grounding element 72B is engaged by a connector 74B, providing an electrical connection to grounding wire 76B, corresponding to grounding wire 76.

The sensing circuit 66 is connected to the sensing conductor 54, to the active shield 56 and to the seat cushion grounding element 72. The circuit 66 may be in the form of an integrated circuit, and may include a timer, an amplifier, and a frequency to voltage converter. Circuit 66 may be configured to provide a voltage signal indicative of an electrical capacitance at the conductive sensor as described in more detail below.

Figure 4:
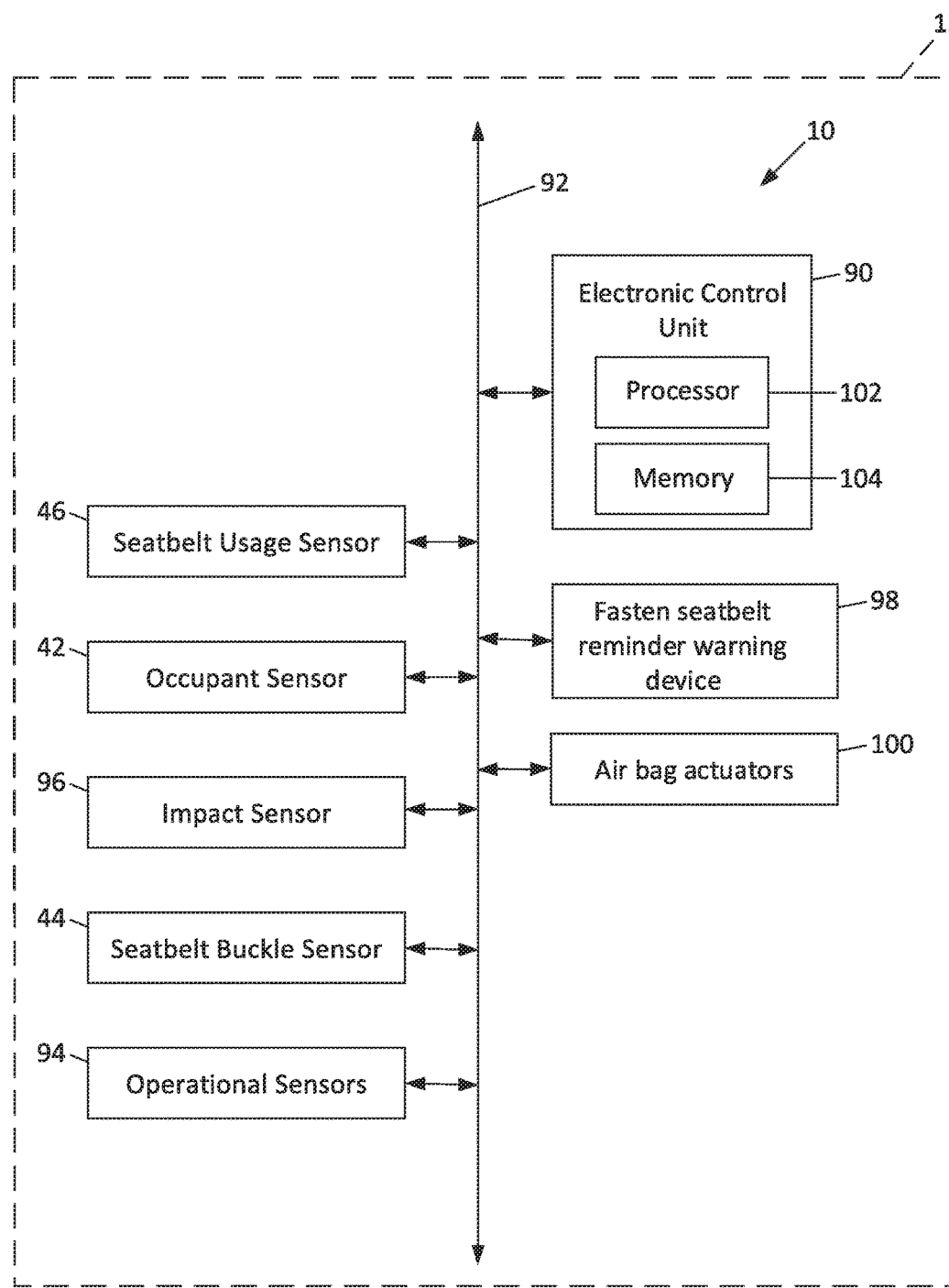
FIG. 4 is a block diagram of an example vehicle incorporating the system of FIG. 1.

The combination of the seatbelt 26, the sensing conductor 54, the shield 56, and the belt electrical connectors 58, 60 may be included in a seatbelt assembly 85. The seatbelt assembly 85 may include the entire body sensing packet 53. System 10 also includes a computing device, e.g., an electronic control unit ("ECU") 90. As illustrated in FIG. 4, the restrain system 10 may include a plurality of sensors and a plurality of actuators, connected to the ECU 90 via a vehicle network 92. Connections to the ECU 90 of sensors and actuators may be made either by wire or wirelessly, as with Bluetooth® signal transmitting equipment and methods, or with other wireless signal transmission technology.

The restraint system 10 may include additional sensors such as, by way of example, operational sensors 94 and vehicle impact sensors 96.

The operational sensors 94 provide data signals evidencing that the vehicle 12 is in an operational mode, i.e., a state consistent with operation, i.e., movement. Example operational sensors may include the ignition switch of a car including an internal combustion engine. In a "run" position or condition, the ignition switch is indicative of a readiness of the vehicle to be operated. Another example operational sensor suited for an electrically powered vehicle may be include a switch, however managed, used by the occupant of the seat 14 to indicate a readiness to begin operation of the vehicle. Vehicle impact sensors 96 may include accelerometers.

The airbags of restraint system 10, when included, incorporate actuators 100, i.e., inflators, that may also connect to network 92. Actuators 100 may be actuated to deploy the associated airbags responsive to signals or data from the vehicle impact sensors 96.

A reminder warning device, e.g., an electronic reminder chime 98, may also be connected to network 92. The chime 98 may be incorporated into an audio system of the vehicle 12. The chime may be used as a warning signal to a vehicle operator to indicate the unbuckled condition of one the seatbelt 26. Alternative warning signals may be provided by alternative devices and alternative forms including a message on a driver information screen, or a flashing light, or an audible spoken-language message in one or more languages. As an alternative to warnings, or supplemental to warnings, the movement or engine ignition of the vehicle 12 may not be initiated until proper occupant buckling is confirmed.

The ECU 90 may be comprised of a single computing device, as shown in FIG. 2, or may alternatively be comprised of a plurality of computers (e.g., ECUs), including, for example, a powertrain computer, itself potentially comprising an engine computer and a transmission computer, an infotainment computer, a chassis systems computer, a restraint system computer, a vehicle security computer, and so on. The ECU 90 includes an electronic processor 102 and an associated memory 104. The system 10 may further include the vehicle network 92 including one or more wired and/or wireless communications media such as an example system Control Area Network ("CAN") bus or a Local Interconnect Network ("LIN") and/or other communications media. Network 92 provides a transmission media between and connecting elements of the restrain system 10 including the ECU 90 and components and ancillary systems including, by way of example, operational sensors 94, seatbelt buckle sensors 44, occupant sensor 42, retractors 30, reminder warning device 98, air bag actuators 100, and vehicle impact sensors 96.

Each of the operational sensors 94, seatbelt buckle sensors 44, occupant sensor 42, retractors 30, reminder warning device 98, air bag actuators 100, and vehicle impact sensors 96 are illustrated as connected directly to ECU 90 through network 92, but may alternatively or additionally be connected directly to ECU 90. Such connections may be made by wire, but the connections could alternatively be made wirelessly using Bluetooth or other signal transmission technologies.

The memory 104 of ECU 90 includes one or more forms of computer-readable media, and stores instructions executable by the processor 102 for performing various operations, including such operations as disclosed herein. Processor 102 may read and execute such instructions.

The memory 104 of ECU 90 also stores data. Data may include collected data that is collected from a variety of devices. In general, collected data may include any data from a map database, and any data that may be gathered by any data collection device including operational sensors 94, seatbelt buckle sensors 44, occupant sensor 42, and vehicle impact sensors 96 and/or data computed from such data. The foregoing examples are not intended to be limiting. Other types of data collection devices may be used to provide data to ECU 90. Data may also include calculated data calculated in ECU 90 from collected data and from other calculated data.

The ECU 90 may be programmed to recognize when seats 14 are occupied and when seatbelts are buckled and unbuckled and to initiate a warning signal when occupants are not correctly buckled. Described below is how the above-described system operates.

When the seatbelt 26 is properly buckled over the occupant 28, the sensing conductor 54 senses and measures the capacitance associated with a conductive body, e.g., the occupant 28, against which the sensing conductor 54 rests. The active shield 56 protects the sensing conductor 54 from being affected by conductive material on a side of the seatbelt opposite the sensing conductor 54. This helps prevent the occupant 28 from tricking the system 10 by sitting on a buckled seatbelt. The active shield 56 is maintained at substantially the same electrical potential as the sensing conductor 54 and isolated through the amplifier 64. The capacitance of the occupant will affect a frequency of a signal from the timer of the circuit 60. An example output frequency of the circuit 60 with the seatbelt 26 over the occupant 28 in the seat 14 is 150 kHz.

When the seatbelt 26 is either not buckled, or is not properly buckled, e.g., the seatbelt 26 is under the occupant instead of over the occupant, or the seatbelt 26 is twisted, the sensing conductor 54 is not against the occupant. The sensing conductor 54 may be against the seat bottom 18. When the sensing conductor 54 is against the seat bottom 18, the grounding element 72 blocks the sensing conductor 54 from inadvertently sensing capacitance in nearby conductive objects. When the seatbelt 26 is placed under the occupant 28, an example resultant output frequency of the circuit 60 may be 300 kHz.

The difference in frequency is attributable to the effect of the capacitance of the occupant's body. The output signal may be first conditioned to convert the signal to a direct current voltage proportional to the frequency of the output signal and then communicated to the ECU 90. For example, a signal of 7 volts may be generated by a frequency of 300 kHz, indicating improper seatbelt usage, and a signal of 3.5 volts may be generated by a frequency of 150 kHz, indicating proper seatbelt usage.

When it is determined by the ECU that there is an occupant in the seat 14, that the seatbelt 26 is buckled, and that the seatbelt is properly positioned over the occupant 28, logic in the form of a computer program within the ECU 90 may initiate the warning signal, and may prevent initiation of vehicle motion.

When it is determined by the ECU that there is an occupant in the seat 14, and that the seatbelt 26 is not properly buckled, logic in the form of a computer program within the ECU 90 may either terminate the warning signal or block the initiation of the warning signal, and may allow initiation of vehicle motion.

An example system and method for robust sensing of seatbelt usage by vehicle occupants has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A seatbelt assembly comprising:
a seatbelt including a lap band;
a sensing conductor fixed to a first side of the lap band and designed to measure capacitance associated with a conductive body against the first side of the lap band;
a conductive shield fixed to the lap band substantially aligned with and substantially overlapping the sensing conductor, the conductive shield is designed to protect the sensing conductor from measuring capacitance on a second side of the lap band opposite the first side; and
an insulating layer disposed between the sensing conductor and the conductive shield.

2. The seatbelt assembly of claim 1, wherein the sensing conductive shield is fixed to the second side of the lap band and the insulating layer is the lap band.

3. The seatbelt assembly of claim 1, wherein the sensing conductor, the conductive shield and the insulating layer are all on a common side of the lap band.

4. The seatbelt assembly of claim 3, further comprising a non-conductive coating disposed over and enclosing the sensing conductor, the insulating layer, and the conductive shield.

5. The seatbelt assembly of claim 1, further comprising:
a retractor receiving the seatbelt on a spool;

the seatbelt including a shoulder band between the retractor and the lap band;
a latch plate slidably disposed on the seatbelt and separating the lap band from the shoulder band; and
the lap band remaining outside of the retractor when the seatbelt is retracted.

6. The seatbelt assembly of claim 1, further comprising:
a latch plate slidably disposed on the seatbelt and separating the lap band from a shoulder band;
an anchor fixed to an end of the lap band and the seatbelt; and
the sensing conductor including a length of substantially twenty centimeters or more and extending from a first end of the sensing conductor below a lowermost position of the latch plate and the sensing conductor terminating before the anchor.

7. The seatbelt assembly of claim 1, wherein the conductive shield is maintained at substantially the same electrical potential as the sensing conductor.

8. A restraint system comprising:
a seatbelt assembly including:
a seatbelt including a lap band,
a sensing conductor fixed to a first side of the lap band and designed to measure capacitance associated with a conductive body against the first side of the lap band,
a conductive shield fixed to the lap band substantially aligned with and substantially overlapping the sensing conductor, the conductive shield is designed to protect the sensing conductor from measuring capacitance on a second side of the lap band opposite the first side;
an insulating layer disposed between the sensing conductor and the conductive shield; and
a sensing circuit electrically connected to the sensing conductor and the conductive shield.

9. The restraint system of claim 8, wherein the sensing conductive shield is fixed to the second side of the lap band and the insulating layer is the lap band.

10. The restraint system of claim 8, wherein the sensing conductor, the conductive shield and the insulating layer are all on a common side of the lap band.

11. The restraint system of claim 10, further comprising a non-conductive coating disposed over and enclosing the sensing conductor, the insulating layer, and the conductive shield.

12. The restraint system of claim 8, further comprising a computing device programmed to allow vehicle movement only when the computing device determines that the seatbelt is properly buckled based on a signal from the circuit.

13. The restraint system of claim 8, further comprising:
a grounding element disposed on a seat bottom and electrically connected to the sensing circuit, the sensing conductor selectively engageable with the grounding element.

14. The restraint system of claim 13, wherein the grounding element is designed to block the sensing conductor from sensing capacitance when the sensing conductor is against the grounding element.

15. The restraint system of claim 13, wherein the grounding element is conductive fabric.

16. The restraint system of claim 13, wherein the grounding element extends at least one half a length of the seat bottom in a fore-aft direction.

17. The restraint system of claim 8, further comprising:
a retractor receiving the seatbelt on a spool;
the seatbelt including a shoulder band between the retractor and the lap band;
a latch plate slidably disposed on the seatbelt and separating the lap band from the shoulder band; and
the lap band remaining outside of the retractor when the seatbelt is retracted.

18. The restraint system of claim 8, further comprising:
a latch plate slidably disposed on the seatbelt and separating the lap band from a shoulder band;
an anchor fixed to an end of the lap band and the seatbelt; and
the sensing conductor including a length of substantially twenty centimeters or more and extending from a first end of the sensing conductor below a lowermost position of the latch plate and the sensing conductor terminating before the anchor.

19. The restraint system of claim 8, further comprising a computing device programmed to allow vehicle movement only when the computing device determines that the seatbelt is properly buckled based on a signal from the circuit.

20. The restraint system of claim 8, wherein the conductive shield is maintained at substantially the same electrical potential as the sensing conductor.

* * * * *